(12) United States Patent
Pereira Silveira et al.

(10) Patent No.: US 10,949,538 B2
(45) Date of Patent: Mar. 16, 2021

(54) OPERATING SYSTEM INSTALLATIONS USING UNIFORM RESOURCE LOCATORS FROM RADIO FREQUENCY IDENTIFICATION CHIPS

(71) Applicant: Hewlett-Packard Development Company, L.P., Houston, TX (US)

(72) Inventors: Roberto Pereira Silveira, Porto Alegre (BR); Juliano Ciocari, Porto Alegre (BR); Kimon Berlin, Ft. Collins, CO (US); Charles Staub, Porto Alegre (BR); Dirceu Ramos, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 86 days.

(21) Appl. No.: 16/311,124

(22) PCT Filed: Oct. 18, 2016

(86) PCT No.: PCT/US2016/057515
§ 371 (c)(1),
(2) Date: Dec. 18, 2018

(87) PCT Pub. No.: WO2018/075012
PCT Pub. Date: Apr. 26, 2018

(65) Prior Publication Data
US 2020/0218810 A1 Jul. 9, 2020

(51) Int. Cl.
*G06F 16/955* (2019.01)
*G06F 21/57* (2013.01)
(Continued)

(52) U.S. Cl.
CPC .............. *G06F 21/572* (2013.01); *G06F 8/63* (2013.01); *G06F 9/4406* (2013.01);
(Continued)

(58) Field of Classification Search
CPC .......................... G06F 16/955; G06F 9/3263
See application file for complete search history.

(56) References Cited

U.S. PATENT DOCUMENTS 5,629,981 A * 5/1997 Nerlikar ................... G07C 9/28
713/168
6,177,860 B1 * 1/2001 Cromer ............... G06F 9/44505
340/10.1

(Continued)

OTHER PUBLICATIONS

Daly, D et al, Base Operating System Provisioning and Bringup for a Commercial Supercomputer, Jan. 22, 2007, < http://people.seas.harvard.edu/~apw/papers/Daly07.pdf>.

*Primary Examiner* — Raymond N Phan
(74) *Attorney, Agent, or Firm* — Brooks Cameron & Huebsch PLLC (57) ABSTRACT

In some examples, a computing device can identify, by a processing resource of the computing device, an operating system (OS) uniform resource locator (URL) from a radio-frequency identification (RFID) chip coupled to the processing resource in response to the computing device being powered on, download from an OS repository an OS descriptor using the OS URL from the RFID chip and an OS image using the OS descriptor, and install an OS to a hard disk of the computing device using the OS image downloaded from the OS repository.

19 Claims, 4 Drawing Sheets

(51) Int. Cl.
*G06F 8/61* (2018.01)
*G06F 9/4401* (2018.01)
*G06F 13/42* (2006.01)
*G06F 21/51* (2013.01)
*G06K 19/07* (2006.01)
*G06K 19/077* (2006.01)
*H04L 9/32* (2006.01)

(52) U.S. Cl.
CPC ........ *G06F 13/4282* (2013.01); *G06F 16/955* (2019.01); *G06F 21/51* (2013.01); *G06K 19/0723* (2013.01); *G06K 19/07786* (2013.01); *H04L 9/3263* (2013.01)

(56) References Cited

U.S. PATENT DOCUMENTS

| | | | |
|---|---|---|---|
| 6,347,398 B1* | 2/2002 | Parthasarathy | G06F 8/60 707/999.202 |
| 6,677,852 B1* | 1/2004 | Landt | G06K 7/0008 235/375 |
| 6,836,472 B2* | 12/2004 | O'Toole | H03L 7/0995 370/335 |
| 6,967,577 B2* | 11/2005 | Taylor | G06K 7/0008 340/572.1 |
| 6,978,118 B2* | 12/2005 | Vesikivi | H04M 1/7253 455/41.1 |
| 7,330,118 B2* | 2/2008 | Durham | G06F 21/575 340/10.1 |
| 7,558,958 B2 | 7/2009 | Lieberman et al. | |
| 7,797,525 B2 | 9/2010 | Lee et al. | |
| 9,311,107 B2 | 4/2016 | Hall et al. | |
| 9,632,806 B1* | 4/2017 | Righi | G06F 9/44505 |
| 10,133,782 B2* | 11/2018 | Pryce | G06F 16/2455 |
| 2002/0129265 A1* | 9/2002 | Watanabe | H04L 9/3226 726/22 |
| 2004/0073903 A1* | 4/2004 | Melchione | G06F 8/60 717/172 |
| 2007/0006221 A1* | 1/2007 | Nozaki | G06F 9/4411 717/174 |
| 2007/0067325 A1 | 3/2007 | Weitzner et al. | |
| 2008/0094178 A1* | 4/2008 | Angerer | H01Q 1/2208 340/10.1 |
| 2009/0077674 A1* | 3/2009 | Shin | G06F 8/61 726/31 |
| 2009/0206986 A1* | 8/2009 | Murakami | H04L 63/102 340/5.8 |
| 2010/0156880 A1* | 6/2010 | Lee | G09G 3/3233 345/213 |
| 2010/0229000 A1 | 9/2010 | Png et al. | |
| 2012/0059805 A1 | 3/2012 | Bhogal et al. | |
| 2012/0303762 A1 | 11/2012 | Geiser | |
| 2013/0067209 A1 | 3/2013 | Hall et al. | |
| 2014/0191846 A1 | 7/2014 | Zhao et al. | |
| 2015/0053773 A1 | 2/2015 | Hus et al. | |
| 2015/0235030 A1 | 8/2015 | Chaiken et al. | |
| 2015/0358761 A1 | 12/2015 | Ito | |
| 2018/0032706 A1* | 2/2018 | Fox | G06F 16/254 |

* cited by examiner

OPERATING SYSTEM INSTALLATIONS USING UNIFORM RESOURCE LOCATORS FROM RADIO FREQUENCY IDENTIFICATION CHIPS

BACKGROUND

Installation of a specific operating system requested by end users for computing devices is a common task. Installing an operating system for a computing device can include unpacking the computing device, connecting power to the computing device, manually installing the operating system, testing the operating system, and repacking the computing device.

DETAILED DESCRIPTION

Radio frequency identification (RFID) components such as tags and/or chips may be used to identify and track inventory. Manufacturers may utilize RFID components by attaching them to computing device boxes and/or cases in order to identify and track inventory. For instance, RFID components may be used to track large orders of computing devices. RFID components attached to computing device boxes and/or cases may not be in communication with processors of the computing devices. Further, manually installing operating systems for large orders of computing devices can be a time consuming task.

Operating system installations via radio frequency identification chips according to the disclosure allows for installation of an operating system of a computing device utilizing RFID components in communication with a processor of the computing device. RFID components can identify a specific operating system to be installed in a computing device. As a result, manual installation of operating systems of computing systems may be avoided.

Figure 1:
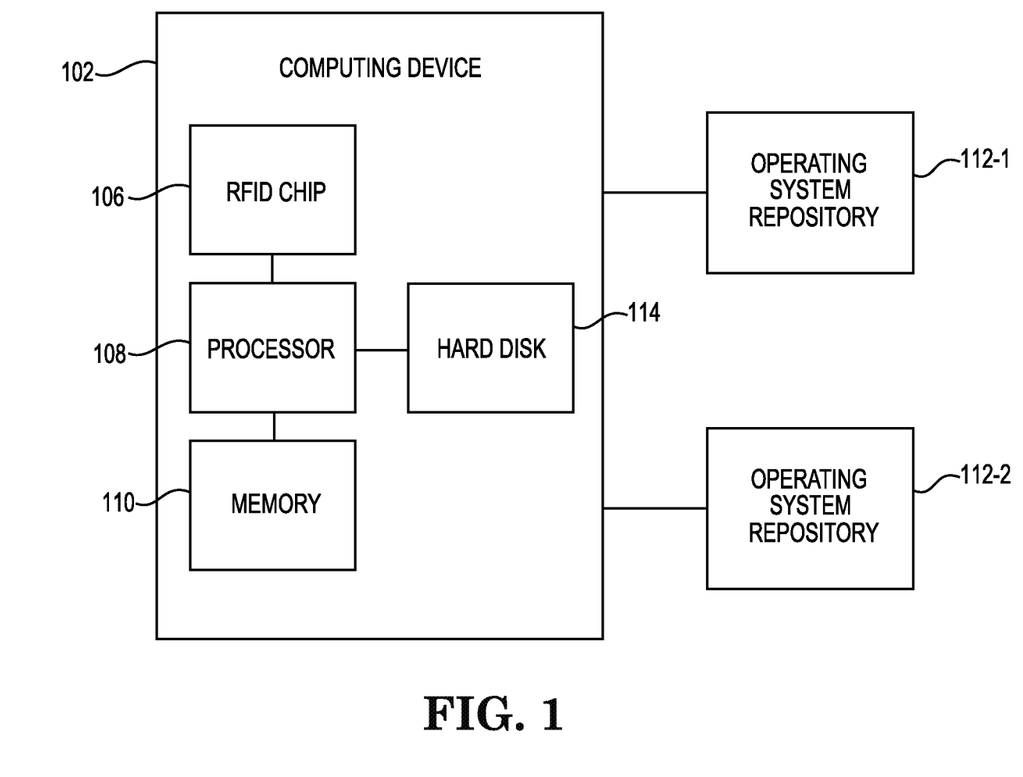
FIG. 1 is a diagram of an example of a computing device for operating system installations via radio frequency identification chips, according to the present disclosure.

FIG. 1 is a diagram of an example of a computing device 102 for operating system installations via radio frequency identification chips, according to the present disclosure. Computing device 102 can include a processor 108, memory 110, radio-frequency identification (RFID) chip 106, and hard disk 114.

Figure 2:
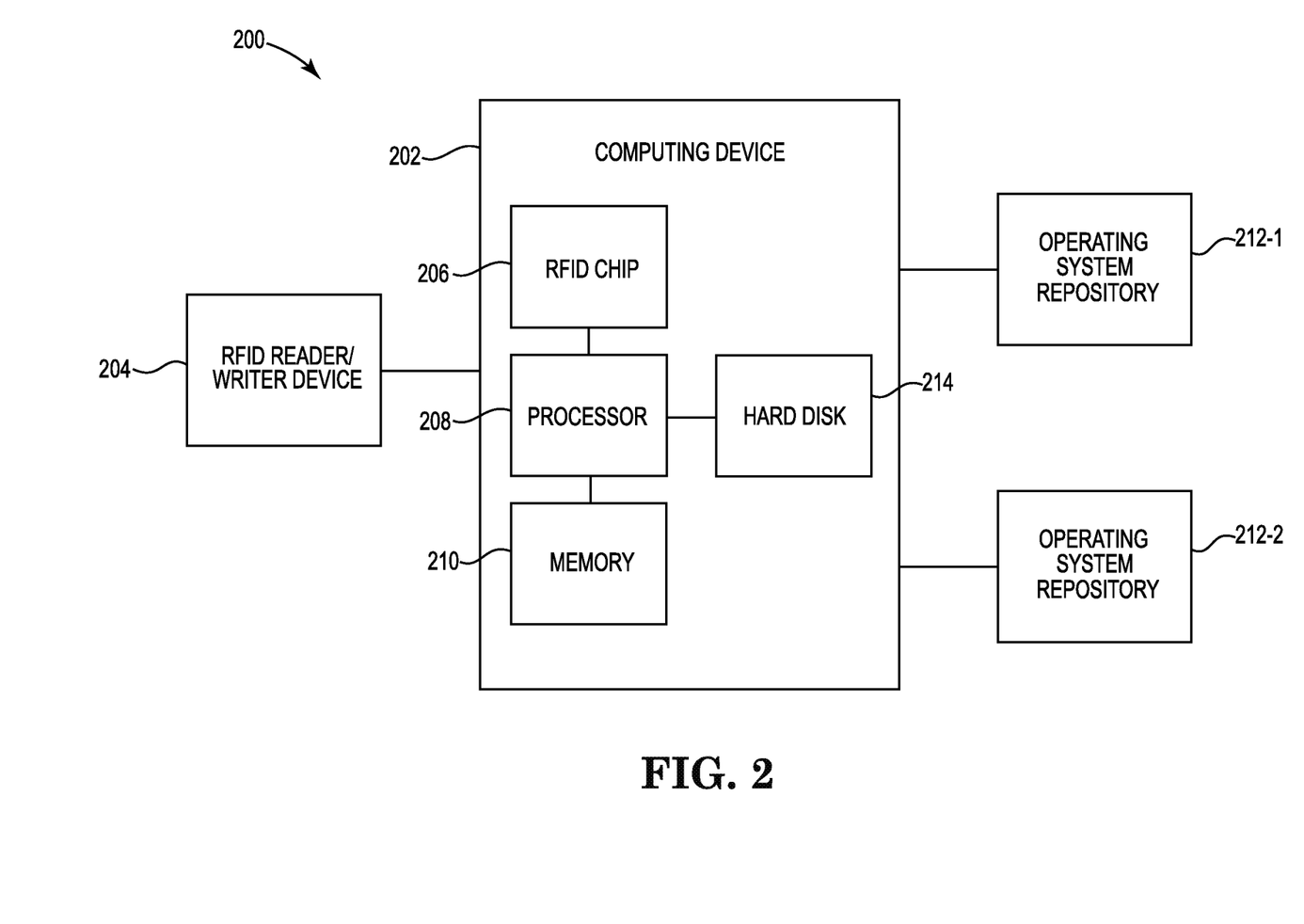
FIG. 2 is a block diagram of an example system for operating system installations via radio frequency identification chips, according to the present disclosure.

Computing device 102 can identify, by processor 108, an OS uniform resource locator (URL) from RFID chip 106 coupled to processor 108 in response to computing device 102 being powered on, as is further described with respect to FIG. 2. As used herein, an RFID chip refers to a device including an integrated circuit for storing and processing information, modulating and demodulating a radio-frequency (RF) signal, and/or collecting power from a reader signal (e.g., an RFID reader/writer device, as is further described with respect to FIG. 2), as well as an antenna for receiving and transmitting a signal. For example, RFID chip 106 may store an OS URL to be identified by processor 108. As used herein, an OS refers to system software, including machine readable instructions, which manages computing device hardware and software resources and provides common services for computing device programs.

As used herein, a URL is a reference to a web resource that specifies the location of the web resource on a network, and a mechanism for retrieving the web resource. A web resource may include an entity that can be identified, named, addressed, and/or handled, including but not limited to documents and/or files. For example, a URL may be a location of a file on a network, although examples of the present disclosure are not so limited.

Processor 108 can identify the OS URL using a unified extensible firmware interface (UEFI). As used herein, UEFI is a specification that defines a software interface between an OS and computing device firmware, where firmware is a type of software, including machine readable instructions, which provide access and control of hardware components to the OS.

Computing device 102 can download, from OS repository 112-1 and/or 112-2, an OS descriptor using the OS URL from RFID chip 106. As used herein, a descriptor refers to a structure including information that describes data. For example, an OS descriptor may be a structure including information that describes OS images, such as locations of OS images in a server, and/or OS configuration information, including OS settings and/or applications to install.

Computing device 102 can download, from OS repository 112-1 and/or 112-2, an OS image using the OS descriptor. As used herein, an image refers to a file including data and the executable code (e.g., instructions) to perform indicated tasks using the data according to encoded instructions. For example, an OS image may be a file including OS data.

OS repository 112-1, 112-2 can be servers that host OS images and/or OS descriptors. As shown in FIG. 1, OS repository 112-1, 112-2 can be remote from computing device 102. Computing device 102 can download OS descriptors and/or OS images from OS repository 112-1, 112-2 via a wired or wireless network.

In some examples, OS repository 112-1 may host OS images and OS repository 112-2 may host OS descriptors. In some examples, OS repository 112-1 may host OS descriptors and OS repository 112-2 may host OS images.

Although OS repository 112-1, 112-2 is shown in FIG. 1 as including two OS repositories, examples of the disclosure are not so limited. For example, only one OS repository may be hosting OS images and OS descriptors.

The wired or wireless network can be a network relationship that connects computing device 102 to OS repository 112-1, 112-2. Examples of such a network relationship can include a local area network (LAN), wide area network (WAN), personal area network (PAN), a distributed computing environment (e.g., a cloud computing environment), storage area network (SAN), Metropolitan area network (MAN), a cellular communications network, and/or the Internet, among other types of network relationships.

Computing device 102 can install an OS to hard disk 114 of computing device 102 using the OS image downloaded from OS repository 112-1, 112-2. As used herein, a hard disk refers to a data storage device used for storing and retrieving digital information.

Processor 108 may be a central processing unit (CPU), a semiconductor based microprocessor, and/or other hardware devices suitable for retrieval and execution of instructions stored in memory 110. Processor 108 may fetch, decode, and execute instructions. As an alternative or in addition to retrieving and executing instructions, processor 108 may include at least one electronic circuit that includes electronic components for performing the functionality of instructions.

Memory 110 may be any electronic, magnetic, optical, or other physical storage device that stores executable instructions and/or data. Thus, memory 110 may be, for example, Random Access Memory (RAM), an Electrically-Erasable Programmable Read-Only Memory (EEPROM), a storage drive, an optical disc, and the like. Memory 110 may be disposed within computing device 102, as shown in FIG. 1. Additionally and/or alternatively, memory 110 may be a portable, external or remote storage medium, for example, that allows computing device 102 to download the instructions from the portable/external/remote storage medium. In this situation, the executable instructions may be part of an "installation package". As described herein, memory 110 may be encoded with executable instructions for operating system installations via radio frequency identification chips.

FIG. 2 is a block diagram of an example system 200 for operating system installations via radio frequency identification chips, according to the present disclosure. As shown in FIG. 2, system 200 may include multiple components. For example, system 200 may include computing device 202, (e.g., computing device 102, described in connection with FIG. 1), RFID reader/writer device 204, and operating system repository 212-1, 212-2 (e.g., operating system repository 112-1, 112-2, previously described in connection with FIG. 1). As previously described in connection with FIG. 1, computing device 202 can include an RFID chip 206, processor 208, memory 210, and hard disk 214.

RFID chip 206 can be coupled to processor 208. For instance, RFID chip 206 can be coupled to processor 208 via a communication channel such as a serial bus. As used herein, a serial bus may refer to a communication system that transfers data between components of a computing device. In some examples, RFID chip 206 can be coupled to processor 208 via an Inter-Integrated Circuit (I2C) bus such that data may be transmitted between RFID chip 206 and processor 208. In some examples, RFID chip 206 can be coupled to processor 208 via a serial peripheral interface (SPI) bus such that data may be transmitted between RFID chip 206 and processor 208.

Although the RFID chip 206 is described as being coupled to processor 208 via a serial bus, examples of the present disclosure are not so limited. For example, the RFID chip 206 may be coupled to processor 208 via a parallel bus.

RFID chip 206 can receive an OS URL from RFID reader/writer device 204. For example, RFID reader/writer device 204 can wirelessly add information, such as an OS URL, to RFID chip 206. As used herein, an RFID reader/writer device may refer to a device that can read and/or write information to an RFID chip. For instance, RFID reader/writer device 204 can be an active reader device, an active writer device, and/or a combination thereof, although examples of the present disclosure are not so limited.

Although RFID chip 206 is described as receiving an OS URL from an RFID reader/writer device 204, examples of the present disclosure are not so limited. For example, the RFID chip 206 may receive, from RFID reader/writer device 204, an encoded URL, an identifier (ID) that represents a URL, or other forms of encoded OS information.

RFID chip 206 can receive an OS URL from RFID reader/writer device 204 when computing device 202 is powered off. In some examples, computing device 202 can be stored and/or packaged in a box to be shipped to a consumer, and RFID chip 206 can receive an OS URL from RFID reader/writer device 204. In some examples, computing device 202 may be on a manufacturing line, and RFID chip 206 can receive an OS URL from RFID reader/writer device 204, although examples of the present disclosure are not limited to such examples.

As used herein, powered off may refer to a power state defined by a computing power specification. For example, powered off may refer to a mechanically off state, as defined by the Advanced Configuration and Power Interface (ACPI) specification. That is, computing device 202 may have power totally removed via a mechanical switch and/or a power cord being removed.

However, examples of the present disclosure are not limited to a mechanically off state. For instance, powered off may refer to a soft off state, such as a power supply unit (PSU) supplying power to a power button.

Although RFID chip 206 is described as receiving an OS URL from RFID reader/writer device 204 when computing device 202 is powered off, examples of the present disclosure are not so limited. For instance, RFID chip 206 can receive an OS URL from RFID reader/writer device 204 when computing device 202 is powered on.

RFID chip 206 can be a passive RFID chip. The passive RFID chip can be ultra-high frequency (UHF). For example, RFID chip 206 can be a passive UHF RFID chip that communicates with an RFID reader/writer device in a frequency band range of 300 Megahertz (MHz) to 3 Gigahertz (GHz). However, examples of the disclosure are not limited to a UHF RFID chip. In some examples, the RFID chip can be a low frequency (LF) RFID chip that communicates with an RFID reader/writer device in a frequency band range of 3 kilohertz (KHz) to 300 KHz. In some examples, the RFID chip can be a high frequency (HF) RFID chip that communicates with an RFID reader/writer device in a frequency band range of 3 MHz to 30 MHz. In some examples, the RFID chip can be an ultra wideband (UWB) RFID chip that communicates with an RFID reader/writer device in a frequency band range of 3 GHz to 11 GHz.

Transmission range between RFID chip 206 and RFID reader/writer device 204 can be one meter, although examples of the present disclosure are not limited to one meter. For instance, the transmission range can be greater than one meter or less than one meter.

The transmission range between RFID chip 206 and RFID reader/writer device 204 may be configurable. For example, a transmission power of RFID chip 206 and/or RFID reader/writer device 204 may be increased or decreased to increase or decrease transmission range, respectively.

As used herein, a passive RFID chip refers to an RFID chip that uses a transmitted signal, such as a signal from an RFID reader/writer device, to power and transmit a signal back to the RFID reader/writer device. That is, a passive RFID chip does not require its own power source, such as a dedicated battery or capacitor.

Although RFID chip 106 and 206 is shown in FIGS. 1 and 2, respectively, and described as an RFID chip, such as a passive UHF RFID chip, examples of the present disclosure are not so limited. In some examples, a low energy Bluetooth chip with a power source, such as a battery, may be utilized to receive an OS URL. In some examples, other passive chips and/or semi-passive chips may be utilized to receive an OS URL.

Processor 208 can download an OS descriptor from the OS repository 212-1 and/or 212-2. The OS descriptor can be a descriptor corresponding to the OS URL. For example, OS repository 212-1, 212-2 may include many different OS descriptors, where each OS descriptor corresponds to an OS URL.

Processor 208 can download an OS image from the OS repository 212-1 and/or 212-2. The OS image can be an image file corresponding to the OS descriptor. For example, OS repository 212-1, 212-2 may include many different OS image files, where each OS descriptor corresponds to an OS image file. Therefore, utilizing the OS URL, processor 208 can download an OS descriptor that corresponds to the OS URL from RFID chip 206, and then download an OS image that corresponds to the OS descriptor.

Processor 208 can download the OS descriptor and the OS URL in response to computing device 202 being powered on. For example, once computing device 202 has been supplied power and has been powered on, processor 208 may begin downloading the OS descriptor and the OS image. The OS descriptor and the OS image may be downloaded using a UEFI network stack.

Processor 208 can install an OS to hard disk 214. As previously described in connection with FIG. 1, an OS image can be a file including OS data. Processor 208 can utilize the OS image to install an OS to hard disk 214 of computing device 202.

Processor 208 can install a new OS to hard disk 214. For example, if no OS is installed to hard disk 214, such as in the example of a new hard disk 214 or new computing device 202, processor 208 can install a new OS to hard disk 214.

Processor 208 can replace an existing OS of hard disk 214. For example, if an OS is already installed to hard disk 214, processor 208 can install a new OS to hard disk 214, replacing (e.g., removing and/or writing over) the existing OS.

Operating system installation utilizing an RFID chip storing an OS URL from an RFID reader/writer device may ease configuration of operating systems of computing devices by avoiding manual installation of an OS on individual computing devices. For instance, a user, such as a vendor and/or retailer, can avoid having to unpack the computing device, connect power, manually install an OS, test the OS, and repack the computing device. OS installation utilizing an RFID chip can save time and money, especially when faced with a large order of computing devices. Further, OS installation utilizing an RFID chip can accommodate the installation of many different types of operating systems, which may be a customer requirement.

Figure 3:
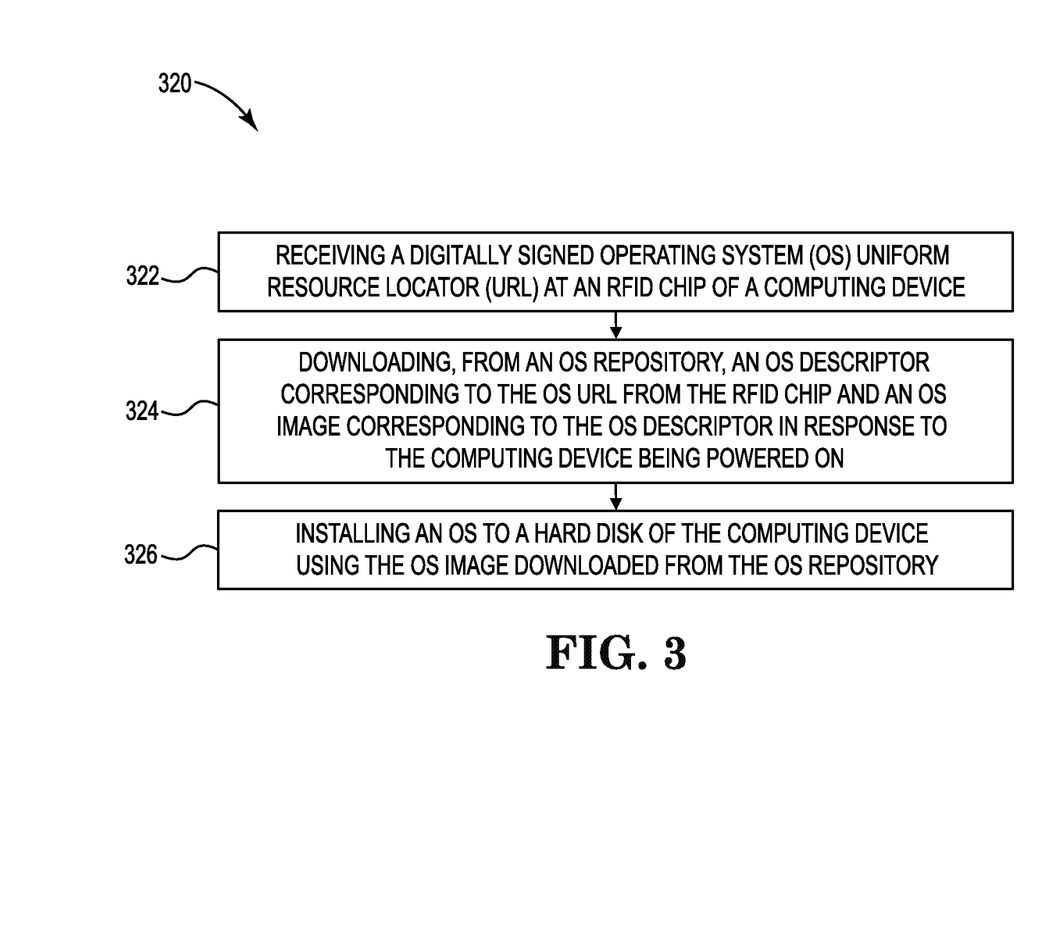
FIG. 3 illustrates an example of a method of operating system installations via radio frequency identification chips, according to the present disclosure.

FIG. 3 illustrates an example of a method 320 of operating system installations via radio frequency identification chips, according to the present disclosure. Method 320 may be performed, for example, by computing devices 102 and 202 described in connection with FIGS. 1 and 2, respectively.

At 322, method 320 includes receiving digitally signed operating system (OS) uniform resource locator (URL) at an RFID chip of a computing device. As previously described, the computing device may include an RFID chip, which can receive an OS URL from an RFID reader/writer device.

The digital signature of the OS URL can be verified by a key. For example, for security reasons, an OS URL may be digitally signed. As used herein, a digitally signed OS URL refers to a digital signature to demonstrate the authenticity of a digital message or digital documents, including digital files. The method may include verifying the digital signature of the OS URL, as is further described in connection with FIG. 4.

Although the OS URL is described as being digitally signed, examples of the disclosure are not so limited. For example, the OS URL can be encrypted. As used herein, encryption may refer to encoding the OS URL such that authorized parties may use it. The method may further include decrypting the OS URL.

At 324, method 320 includes downloading, from an OS repository, an OS descriptor corresponding to the OS URL from the RFID chip and an OS image corresponding to the OS descriptor in response to the computing device being powered on. The OS descriptor can be a descriptor corresponding to the OS URL, and the OS image can be an image file corresponding to the OS descriptor. Utilizing the OS URL and OS descriptor, the correct OS image can be downloaded from the OS repository.

At 326, method 320 may include installing an OS to a hard disk of the computing device using the OS image downloaded from the OS repository. For example, a processor of the computing device can install an OS to the hard disk of the computing device utilizing the OS image downloaded from the OS repository.

Figure 4:
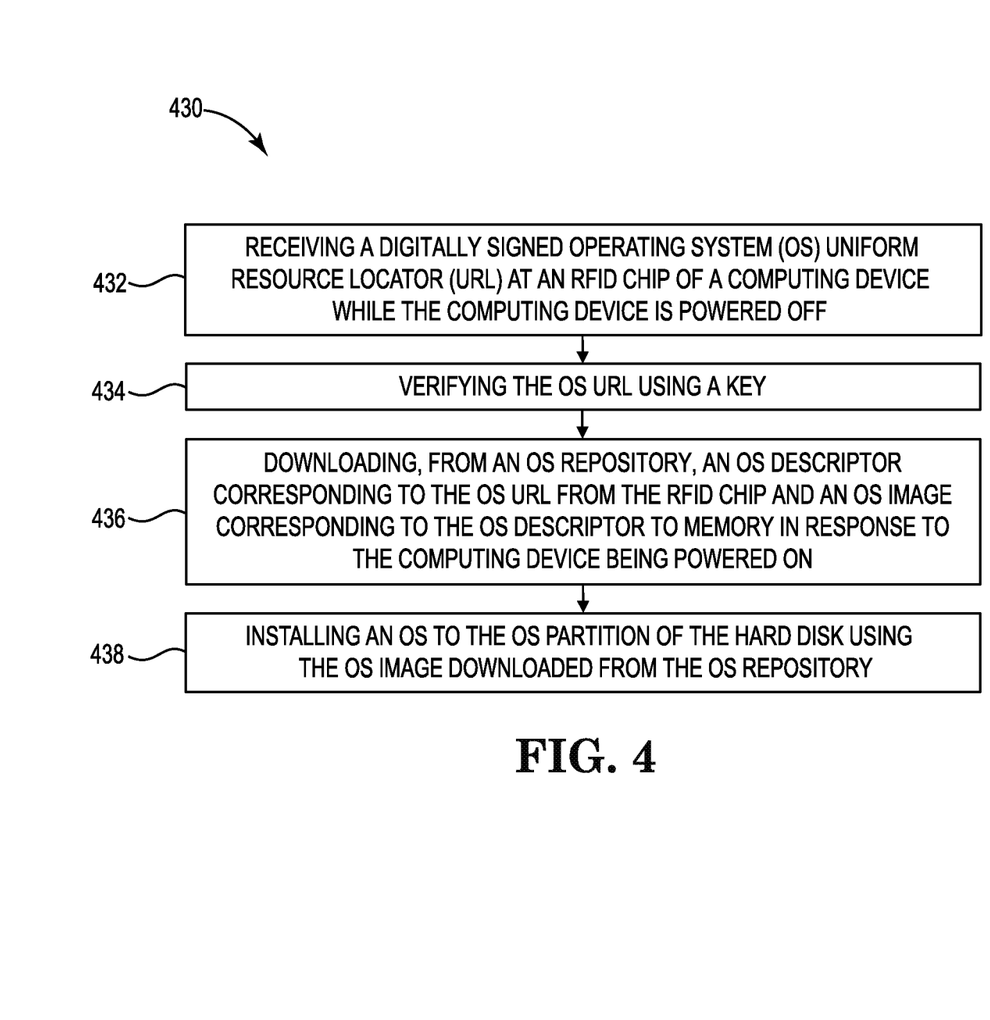
FIG. 4 illustrates an example of another method of operating system installations via radio frequency identification chips, according to the present disclosure.

FIG. 4 illustrates an example of another method 430 of operating system installations via radio frequency identification chips, according to the present disclosure. Method 430 may be performed, for example, by computing devices 102 and 202 described in connection with FIGS. 1 and 2, respectively.

At 432, method 430 includes receiving a digitally signed OS uniform resource locator (URL) at an RFID chip of a computing device while the computing device is powered off. As previously described, the computing device may include an RFID chip, which can receive an OS URL from an RFID reader/writer device. For example, the RFID reader/writer device can be an active reader device that can read and/or write information to the RFID chip while the computing device is powered off.

At 434, method 430 includes verifying the OS URL using a key. The key can be a public key. For example, a public key may be used to determine whether the OS URL was created by a known source and that the OS URL was not altered while being received at the RFID chip. As used herein, a public key may be a key generated with a private key when a digital signature is created, where a public key can be used to verify the private key to verify the digital signature. The computing device can verify the OS URL via the public key before downloading the corresponding OS descriptor.

As described in FIG. 3, an OS URL may be additionally or alternatively encrypted for security reasons. Therefore, the computing device can decrypt the OS URL in order to utilize the OS URL to download the corresponding OS descriptor. As used herein, decryption may refer to decoding the OS URL such that an authorized party may use it. The computing device can decrypt the OS URL before downloading the corresponding OS descriptor.

At 436, method 430 includes downloading, from an OS repository, an OS descriptor corresponding to the OS URL from the RFID chip and an OS image corresponding to the OS descriptor to memory in response to the computing device being powered on. As previously described, the OS descriptor can be a descriptor corresponding to the OS URL, and the OS image can be an image file corresponding to the OS descriptor. Utilizing the OS URL and OS descriptor, the correct OS image can be downloaded from the OS repository to memory.

A hard disk of the computing device can be partitioned in response to downloading the OS descriptor. For example, the hard disk may be partitioned to create different regions on the hard disk such that information in each region may be managed separately. For example, the hard disk may be partitioned to include an OS partition.

At 438, method 430 includes installing an OS to the OS partition of the hard disk using the OS image downloaded from the OS repository. As previously described, a processor of the computing device can install an OS to the hard disk of the computing device utilizing the OS image downloaded from the OS repository. The processor can install the OS to the OS partition.

In the foregoing detailed description of the present disclosure, reference is made to the accompanying drawings that form a part hereof, and in which is shown by way of illustration how examples of the present disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a plurality of additional examples of the present disclosure. In addition, the proportion and the relative scale of the elements provided in the figures are intended to illustrate the examples of the present disclosure, and should not be taken in a limiting sense. As used herein, the designator "M", particularly with respect to reference numerals in the drawings, indicates that a plurality of the particular feature so designated can be included with examples of the present disclosure. The designators can represent the same or different numbers of the particular features.

What is claimed:

1. A non-transitory computer readable medium storing instructions executable by a processing resource in a computing device to:
   in response to the computing device being powered on, identify, by the processing resource in the computing device, an operating system (OS) uniform resource locator (URL) from a radio-frequency identification (RFID) chip included in the computing device;
   download, from an OS repository:
      an OS descriptor using the OS URL from the RFID chip, and
      an OS image using the OS descriptor; and
   install an OS to a storage device of the computing device using the OS image downloaded from the OS repository.

2. The non-transitory computer readable medium of claim 1, wherein the instructions when executed further cause the processing resource to identify the OS URL using a unified extensible firmware interface (UEFI).

3. The non-transitory computer readable medium of claim 1, wherein the instructions to install the OS include instructions to install a new OS to the storage device.

4. The non-transitory computer readable medium of claim 1, wherein the instructions to install the OS include instructions to replace an existing OS of the storage device.

5. The non-transitory computer readable medium of claim 1, wherein the OS URL is wirelessly received at the RFID chip included in the computing device from an RFID reader/writer device.

6. The non-transitory computer readable medium of claim 1, wherein the OS URL is wirelessly received at the RFID chip from an RFID reader/writer device while the computing device is off.

7. The non-transitory computer readable medium of claim 1, wherein the RFID chip is coupled over a bus to the processing resource, and the instructions are executable by the processing resource to read the OS URL from the RFID chip over the bus.

8. The non-transitory computer readable medium of claim 2, wherein the OS descriptor and the OS image are downloaded using a UEFI network stack.

9. The non-transitory computer readable medium of claim 6, wherein the RFID chip is a passive RFID chip.

10. A computing device comprising:
    a memory;
    a processor to execute instructions stored in the memory;
    a radio-frequency identification (RFID) chip coupled to the processor; and
    a storage device, wherein:
       the RFID chip is to receive an encrypted operating system (OS) uniform resource locator (URL) from an RFID reader/writer device;
       the processor is to:
          decrypt the encrypted OS URL from the RFID chip included in the computing device to derive a decrypted OS URL,
          in response to the computing device being powered on, download, to the memory from an OS repository:
             an OS descriptor corresponding to the decrypted OS URL, and
             an OS image corresponding to the OS descriptor, and install, to the storage device of the computing device, an OS using the OS image downloaded from the OS repository.

11. The computing device of claim 10, wherein the RFID chip is coupled to the processor via a serial bus in the computing device.

12. The computing device of claim 10, wherein the RFID chip is a passive ultra-high frequency (UHF) RFID chip.

13. The computing device of claim 10, wherein the OS repository is remote from the computing device.

14. The computing device of claim 10, wherein the RFID chip is to receive the encrypted OS URL from the RFID reader/writer device while the computing device is off.

15. A method, comprising:
    receiving, from a radio-frequency identification (RFID) read/write device, a digitally signed operating system (OS) uniform resource locator (URL) at an RFID chip of a computing device while the computing device is powered off;
    verifying, by the computing device, the OS URL using a key;
    downloading, by the computing device from an OS repository in response to the computing device being powered on;
       an OS descriptor corresponding to the OS URL from the RFID chip, and
       an OS image corresponding to the OS descriptor, wherein the OS descriptor and the OS image are downloaded to a memory of the computing device; and
    installing, by the computing device, an OS to a storage device of the computing device using the OS image downloaded from the OS repository.

16. The method of claim 15, wherein the key is a public key, and wherein the method comprises verifying the OS URL using the public key.

17. A method comprising:
receiving, from a radio-frequency identification (RFID) read/write device, a digitally signed operating system (OS) uniform resource locator (URL) at an RFID chip of a computing device;
verifying, by the computing device, the OS URL using a key;
downloading, by the computing device from an OS repository in response to the computing device being powered on:
   an OS descriptor corresponding to the OS URL from the RFID chip, and
   an OS image corresponding to the OS descriptor, wherein the OS descriptor and the OS image are downloaded to a memory of the computing device;
partitioning, in response to downloading the OS descriptor, a storage device by the computing device such that the hard disk storage device includes an OS partition; and
installing, by the computing device, an OS to the storage device of the computing device using the OS image downloaded from the OS repository.

18. The method of claim 17, comprising installing the OS to the OS partition.

19. The computing device of claim 14, wherein the RFID chip is a passive RFID chip.

\* \* \* \* \*